United States Patent [19]
Lauritsen

[11] Patent Number: 5,212,936
[45] Date of Patent: May 25, 1993

[54] DISC CUTTER BAR

[75] Inventor: Georg Lauritsen, Kerteminde, Denmark

[73] Assignee: Maskinfabriken Taarup A/A, Kerteminde, Denmark

[21] Appl. No.: 778,063
[22] PCT Filed: Jun. 6, 1990
[86] PCT No.: PCT/DK90/00138
§ 371 Date: Dec. 6, 1991
§ 102(e) Date: Dec. 6, 1991
[87] PCT Pub. No.: WO90/14754
PCT Pub. Date: Dec. 13, 1990

[30] Foreign Application Priority Data
Jun. 7, 1989 [DK] Denmark ............... 2779/89

[51] Int. Cl.$^5$ ............... A01D 34/66
[52] U.S. Cl. ............... 56/6; 56/13.6
[58] Field of Search ............... 56/6, 136

[56] References Cited
U.S. PATENT DOCUMENTS

| | | | |
|---|---|---|---|
| 4,157,004 | 6/1979 | van der Lely | 56/13.6 |
| 4,231,216 | 11/1980 | Weber | 56/13.6 |
| 4,237,679 | 12/1980 | van der Lely | 56/13.6 |
| 4,426,827 | 1/1984 | Oosterling et al. | 56/13.6 |
| 4,497,161 | 2/1985 | Vissers et al. | 56/13.6 |
| 4,693,061 | 9/1987 | Koch et al. | 56/13.6 |
| 4,709,540 | 12/1987 | Collart | 56/13.6 |
| 4,727,711 | 3/1988 | Quataert | 56/16.2 |
| 4,986,060 | 1/1991 | Walters et al. | 56/13.6 X |
| 4,986,061 | 1/1991 | Frumholtz et al. | 56/6 |

FOREIGN PATENT DOCUMENTS 2825665  4/1987  Fed. Rep. of Germany.

Primary Examiner—David J. Bagnell
Attorney, Agent, or Firm—Jacobson, Price, Holman & Stern

[57] ABSTRACT

A disc cutter bar including an upper part and a lower part which are welded together along an edge to form a housing for a row of gear wheels through which cutter discs are driven. The bar is provided with an elongation extending rearwardly in cross-section from the gear wheel row, which partly results in an increase of the stiffness and strength of the bar with a simultaneous low constructional height and partly makes it possible to increase the oil amount in the housing.

5 Claims, 2 Drawing Sheets

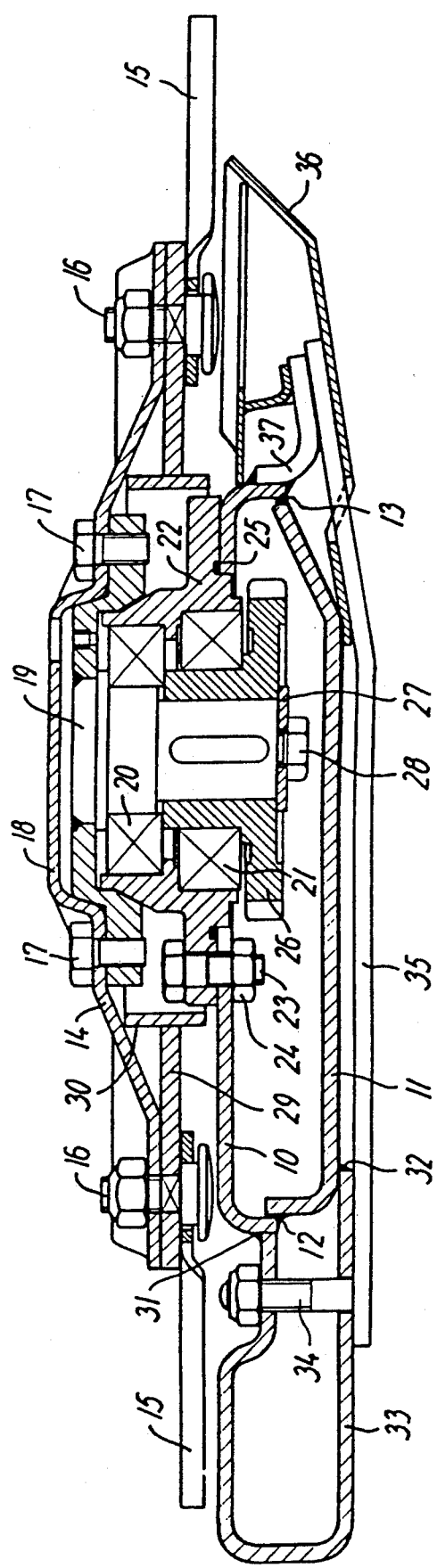
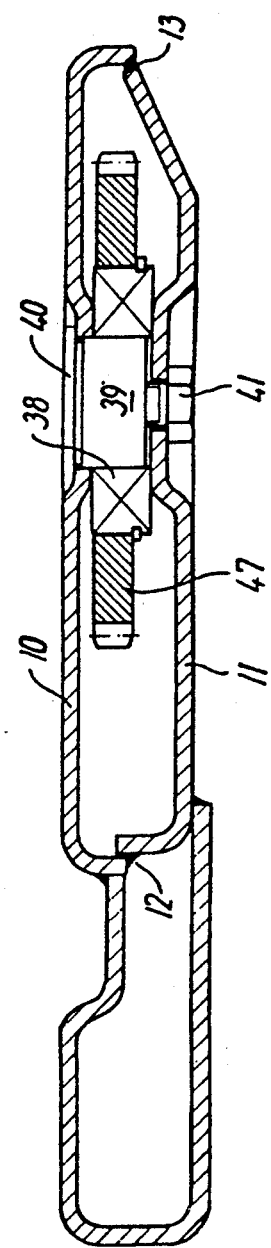

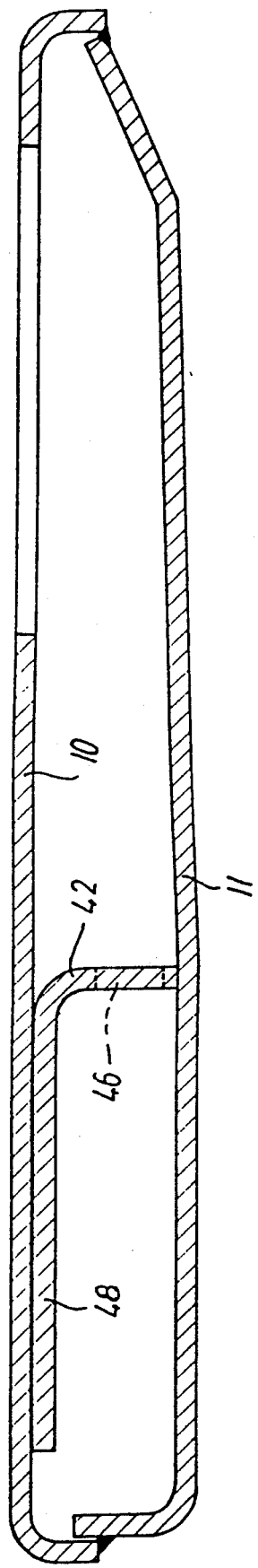
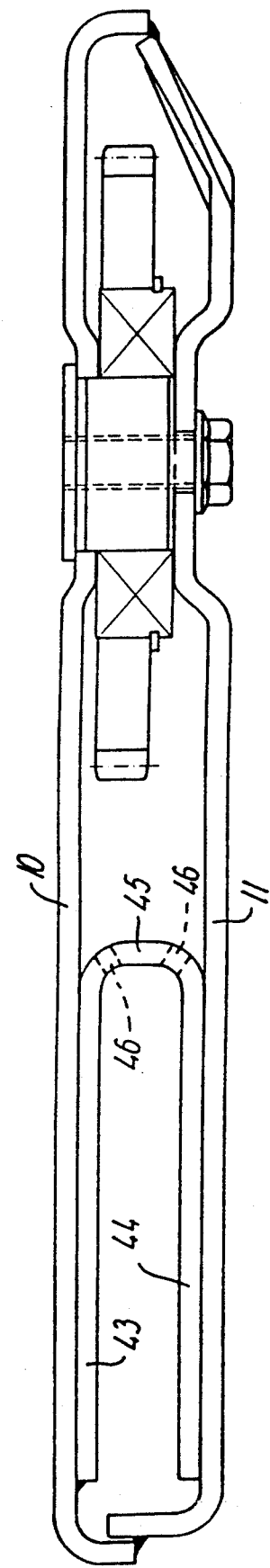

DISC CUTTER BAR

FIELD OF THE INVENTION

The present invention relates to a disc cutter bar comprising an elongate, relatively flat housing formed by an upper part, and a lower part, which parts form an upper wall, a lower wall, a front wall and a rear wall, and having a plurality of cutter discs which are rotatable about substantially vertical axes and whose shafts carry gear wheels which are arranged in the housing and are in drive connection with each other through a row of idle gear wheels, the cutter bar being provided with a longitudinal reinforcing beam extending rearwardly with respect to the rear wall of the housing and having an upper wall and a lower wall which are welded to or integral with the upper part and lower part respectively of the housing so as to define a cavity extending longitudinally and defined by the rear wall.

BACKGROUND OF THE INVENTION

A disc cutter bar of this general type has been disclosed in U.S. Pat. No. 4,426,827.

In U.S. Pat. No. 4,709,540 a disc cutter bar is shown in which the housing is reinforced by means of a box-shaped beam provided with a series of regularly spaced, forwardly protruding ears which are fixed to a rearwardly extending flange on the housing by bolts and nuts.

SUMMARY OF THE INVENTION

According to the present invention the disc cutter bar is provided with a longitudinal reinforcing beam extending rearwardly with respect to the rear wall of the housing and having an upper wall and a lower wall which are welded to or integral with the upper part and lower part respectively of the housing so as to define a cavity extending longitudinally along and defined by the rear wall.

The structure thus defined is cheaper to produce and more rigid than the prior art bars mentioned above. In addition, a convenient possibility is provided to increase the amount of oil available to the gear housing by utilizing the cavity of the reinforcing beam as an oil reservoir, so that lubrication of the many movable parts can be improved and the life thereby prolonged.

In one embodiment of the invention, a reinforcing beam is fixed to the gear housing by welding, whereas in another embodiment a reinforcing beam is integral with the gear housing.

BRIEF DESCRIPTION OF THE DRAWINGS

The invention will be explained more fully below with reference to the drawing in which, FIG. 1 is a cross-section through an embodiment of the disc cutter bar of the invention through a cutter disc axis.

FIG. 2 is a cross-section of the same bar through an idle wheel axis.

FIG. 3 is a cross-section of a second embodiment of the bar of the invention through the axis position of a cutter disc, which is not shown, but may be of the same type as one shown in FIG. 1.

FIG. 4 is a cross-section of a third embodiment of the bar of the invention through an idle wheel axis.

DETAILED DESCRIPTION OF THE PREFERRED EMBODIMENTS

In FIGS. 1 and 2, 10 is the upper part and 11 is the lower part of a disc cutter bar. The two parts are welded together along the edges as shown at 12 and 13 to form a housing for the gear wheels driving the cutter discs. Such a cutter disc is shown at 14 in FIG. 1. It carries cutters 15 at two diametrically opposite positions at the periphery, said cutters being pivotable about bolts 16. The disc is secured by bolts 17 to a hub 18 which is welded to a shaft 19, which is journaled in a bearing ring 22 by means of ball bearings 20 and 21. The bearing ring 22 is secured to the upper part 10 by means of bolts 23 and nuts 24 which are welded to the inner side of the upper part. An 0-ring 25, fitted in an annular groove in the bearing ring, is interposed between the bearing ring 22 and the upper part 10. The inner end of the shaft 19 has wedged to it a gear wheel 26 which is additionally kept in position by a retaining disc 27 and a bolt 28 screwed into the end of the shaft.

The cutter carrying bolts 16 also serve to secure a ring-shaped disc 29, which, at its inner edge, carries a cylindrical guard 30 coaxial with the cutter disc.

A longitudinal, cross-sectionally substantially U-shaped reinforcement bar 33 is welded to the rear edge of the upper part 10 and the lower part at 31 and 32, respectively, said reinforcement bar 33 serving to increase the resistance of the disc cutter bar against bending. The rear end of a plurality of slide rails 35 is secured to the reinforcement bar by means of bolts 34, and the front end of said slide rails 35 is welded to a substantially wedge-shaped front part 36, which is secured to the front edge of the housing 10, 11 by means of a welded angular member 37.

FIG. 2 shows an idle wheel 47 in the same disc cutter bar. This idle wheel is rotatably journaled through a ball bearing 38 on a hub cylinder 39 extending through an opening in the upper part 10 and is secured by means of a collar 40, which engages over the edge of this opening, as well as a bolt 41, which extends through a hole in the lower part 11 and is screwed into the hub cylinder, in the housing 10, 11 through its outer end, which is provided, for the same reason, with an opening suitable for the purpose.

The disc cutter bar embodiment shown in FIG. 3 differs from the one shown in FIGS. 1 and 2 in that the reinforcement is not welded, but is formed by the actual upper part 10 and lower part 11, which are here provided with an extra large width to form the elongation extending rearwardly in cross-section. A cross-sectionally L-shaped reinforcement element is arranged between the extended parts and has its long leg 48 in engagement with the upper part 10 and its short leg 42 at right angles to the two parts with the lower edge in engagement with the lower part.

A similar construction shown in FIG. 4 has a cross-sectionally U-shaped reinforcement element with the long legs 43 and 44 engaging the upper part 10 and the lower part 11, respectively, and the short leg or cross member 45 arranged at right angles thereto.

Both the leg 42 in FIG. 3 and the cross member 45 in FIG. 4 may be provided with openings 46 so that the space formed by the elongation may be utilized for increasing the amount of oil in the bar.

The embodiments shown and described above of the disc cutter bar of the invention are just to be considered as examples since the reinforced, rearwardly extending elongations and the optional extra reinforcement elements may be provided in many other ways than shown and described.

The invention has been explained on the basis of a disc cutter bar consisting of the two parts, an upper part and a lower part which are welded together along the edges. However, the disc cutter bar may also be made of a single plate which is bent and only welded along one edge of the bar.

I claim:

1. A disc cutter bar comprising:
   an elongate, relatively flat housing formed by an upper part and a lower part forming an upper wall, a lower wall, a front wall and a rear wall,
   a plurality of cutter discs which are rotatable about substantially vertical axes and have rotary shafts carrying gear wheels which are arranged in said housing and are in drive connection with each other through a row of idle gear wheels,
   said cutter bar being provided with a longitudinal reinforcing beam extending rearwardly with respect to the rear wall of said housing and having an upper wall and a lower wall which are welded to or integral with the upper part and lower part respectively of said housing so as to define a cavity extending longitudinally and defined by said rear wall.

2. A disc cutter bar as defined in claim 1, wherein said rearward extension is formed by a cross-sectionally substantially U-shaped plate element having legs which are welded to the upper and lower parts respectively of said housing.

3. A disc cutter bar as defined in claim 1, wherein said rearward extension is integral with said housing and wherein a cross-sectionally substantially L-shaped or U-shaped reinforcement element is incorporated in the rearward extension, said reinforcement element having its short leg or transverse member extending between and substantially at right angles to the upper part and the lower part to form said rear wall and being provided with one or more openings.

4. A disc cutter bar comprising:
   an elongate, relatively flat housing formed by an upper part and a lower part forming an upper wall, a lower wall, a front wall and a rear wall,
   a plurality of cutter discs which are rotatable about substantially vertical axes and have shafts carrying gear wheels which are arranged in said housing and are in drive connection with each other through a row of idle gear wheels,
   said cutter bar being provided with a longitudinal reinforcing beam extending rearwardly with respect to the rear wall of said housing and having an upper wall and a lower wall which are welded to the upper part and lower part respectively of said housing so as to define a cavity extending longitudinally and defined by said rear wall,
   said rearward extension being formed by a cross-sectionally substantially U-shaped plate element having legs which are welded to the upper and lower parts respectively of said housing.

5. A disc cutter bar comprising:
   an elongate, relatively flat housing formed by an upper part and a lower part forming an upper wall, a lower wall, a front wall and a rear wall,
   a plurality of cutter discs which are rotatable about substantially vertical axes and have shafts carrying gear wheels which are arranged in said housing and are in drive connection with each other through a row of idle gear wheels,
   said cutter bar being provided with a longitudinal reinforcing beam extending rearwardly with respect to the rear wall of said housing and having an upper wall and a lower wall which are integral with the upper part and lower part respectively of said housing so as to define a cavity extending longitudinally and defined by said rear wall,
   said rearward extension being integral with said housing and a cross-sectionally substantially L-shaped or U-shaped reinforcement element being incorporated in the rearward extension, said reinforcement element having its short leg or transverse member extending between and substantially at right angles to the upper part and the lower part to form said rear wall and being provided with at least one opening.

* * * * *